US009041955B2

(12) United States Patent
Eng et al.

(10) Patent No.: US 9,041,955 B2
(45) Date of Patent: May 26, 2015

(54) PRINTING SYSTEM AND METHODS USING A PRINTER SERVER HOMEPAGE FROM A PRINT SERVER

(75) Inventors: Yaag Whuang Eng, Singapore (SG); Chun Wah Kwan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 13/282,979

(22) Filed: Oct. 27, 2011

(65) Prior Publication Data
US 2013/0107311 A1 May 2, 2013

(51) Int. Cl.
G06F 3/12 (2006.01)
H04L 29/08 (2006.01)

(52) U.S. Cl.
CPC .............. *G06F 3/122* (2013.01); *G06F 3/1225* (2013.01); *G06F 3/1228* (2013.01); *G06F 3/1268* (2013.01); *G06F 3/1287* (2013.01); *G06F 3/1292* (2013.01); *H04L 67/02* (2013.01)

(58) Field of Classification Search
USPC .................................. 358/1.15, 1.1, 1.13, 1.9
See application file for complete search history.

(56) References Cited

U.S. PATENT DOCUMENTS

| | | | |
|---|---|---|---|
| 6,542,892 B1 * | 4/2003 | Cantwell ............................... | 1/1 |
| 6,952,831 B1 | 10/2005 | Moore | |
| 7,212,297 B2 | 5/2007 | Liang et al. | |
| 2002/0007317 A1 * | 1/2002 | Callaghan et al. ............... | 705/26 |
| 2002/0138564 A1 | 9/2002 | Treptow et al. | |
| 2004/0105127 A1 * | 6/2004 | Cudd et al. .................... | 358/1.18 |
| 2004/0130744 A1 | 7/2004 | Wu et al. | |
| 2006/0077421 A1 | 4/2006 | Eden et al. | |
| 2006/0274369 A1 * | 12/2006 | Yamamoto .................... | 358/1.15 |
| 2006/0277483 A1 * | 12/2006 | Yamamoto ..................... | 715/764 |
| 2007/0067331 A1 * | 3/2007 | Schachter et al. ............ | 707/102 |
| 2007/0288644 A1 * | 12/2007 | Rojas et al. .................... | 709/230 |
| 2008/0231886 A1 | 9/2008 | Wehner et al. | |
| 2010/0082771 A1 * | 4/2010 | Wood et al. .................... | 709/219 |

OTHER PUBLICATIONS

Apple, "Apple—iPad—Print right from your IPad with AirPrint," <http://www.apple.com/ipad/features/airprint.html>, pp. 3, Visited: May 19, 2011.
Benoit, "Print to PDF in Google Reader | Joliprint.com,"<http://joliprint.com/2010/10/07/print-to-pdf-google-reader/>, pp. 5, Visited: Oct. 18, 2011.
Danny Thorpe, "Secure Cross-Domain Communication in the Browser,"<http://msdn.microsoft.com/enus/library/bb735305.aspx>, pp. 7, Visited: Oct. 26, 2011.
Easyxdm, "easyXDM—Cross-domain messaging made easy," <http://easyxdm.net/wp/>, pp. 2, Visited Oct. 17, 2011.
Google, "Getting Started with Googie Print," <http://www.google.com/landing/cloudprint/>, pp. 1, Visited: Sep. 24, 2011.

(Continued)

*Primary Examiner* — Martin Mushambo
(74) *Attorney, Agent, or Firm* — Hewlett-Packard Patent Department

(57) ABSTRACT

In one embodiment, a printing method includes accessing a printer server homepage with a browser and adding a bookmarklet to the browser from the homepage. The method includes accessing a content server web page with the browser, and, in response to activation of the bookmarklet, accessing and executing a toolbar script from the printer server to append a webprint toolbar to the web page. In response to activation of a print icon on the webprint toolbar, a proxy script is accessed from the printer server and executed to send the web page from the browser to the printer server.

20 Claims, 8 Drawing Sheets

(56) References Cited

OTHER PUBLICATIONS

Michael Mahemofe, "Cross-Domain Communication with IFrames,"<http://softwareas.com/crossdomaincommunicationwithiframes>, pp. 17, Visited: Oct. 22, 2011.

Papercut, "Chapter 20. Web Print (driver-less printing via a web browser),"<http://www.papercut.com/products/ng/manual/ch-web-print.html>, pp. 2, Visited: Jul. 1, 2011.

Printeron, "PrintSpots How users print,"<http://www.printeron.net/solutions/services/hotspots/how_to_print.html>, pp. 2, Visited: Apr. 1, 2009.

PrintFriendly, "About PrintFriendly & PDF," <http://www.printfriendly.com/about>, pp. 2, Visited: Oct. 19, 2011.

PrintwhatYouLike.com, "Support PrintWhatYouLike.com," <http://www.printwhatyoulike.com/support>, pp. 18, Visited: Oct. 9, 2011.

Readability, "FAQ | Readability: Enjoy Reading. Support Writing," <http://www.readability.com/faq, pp. 3, Visited: Oct. 26, 2011.

Subsimple.com, "Tips for Writing Bookmarklets," <http://subsimple.com/bookmarklets/tips.asp>, pp. 4, Visited: Oct. 24, 2011.

* cited by examiner

PRINTING SYSTEM AND METHODS USING A PRINTER SERVER HOMEPAGE FROM A PRINT SERVER

BACKGROUND

Applications and user data are moving increasingly onto the Web. As a result, the web browser is becoming a primary on-ramp in the user's workflow. The desire for seamless and high-quality printing from the browser is therefore becoming increasingly important. At the same time, the use of mobile computing devices such as smart phones, PDAs, tablet PCs, etc., is growing at a dramatic rate. The market for such devices is estimated to reach into the hundreds of millions over the next several years alone. However, due to their small size and limited computing capability, mobile devices run non-traditional operating systems that provide limited printing functionality.

BRIEF DESCRIPTION OF THE DRAWINGS

The present embodiments will now be described, by way of example, with reference to the accompanying drawings, in which.

DETAILED DESCRIPTION

Overview

Figure 1:
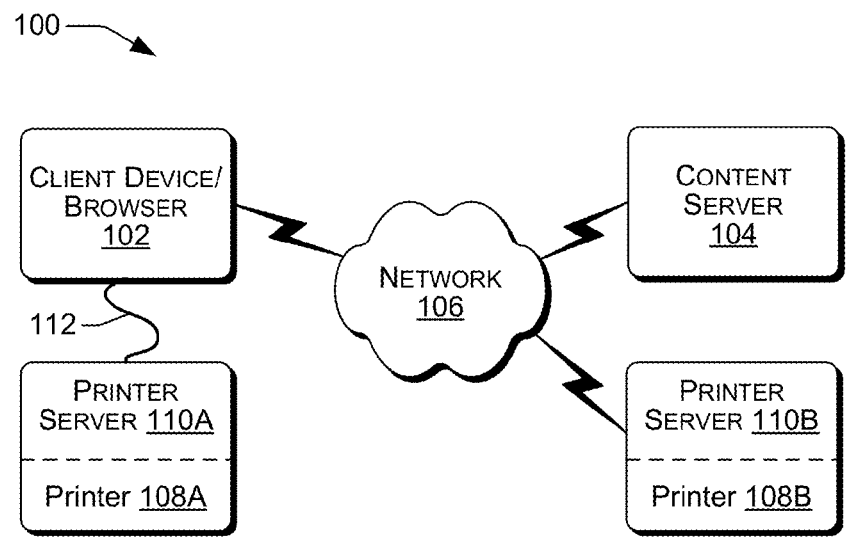
FIG. 1 shows an exemplary computing environment suitable for implementing a printing system and methods as disclosed herein, according to an embodiment.

As generally noted above, the movement of more and more applications and user data onto the Web is making the web browser a primary on-ramp to user workflow. Therefore, providing seamless and high-quality printing functionality from the web browser is becoming increasingly important. However, the use of mobile computing devices that run non-traditional/mobile operating systems continues to grow at a dramatic rate. Such non-traditional or mobile operating systems provide print functionality that is typically less than robust. Thus, while additional development of browser printing functionality would be a significant benefit in the present environment of expanding web-based computing, the concurrent increasing use of mobile computing devices is actually reducing the printing capability of browsers in an overall sense.

Because mobile operating systems generally do not have a print architecture, various other solutions for web browser printing have been developed. One solution, for example, supports direct printing to a limited set of defined printers that support a particular protocol. Another solution uses a separate PC to act as a proxy between the mobile device and the printer. Another solution sends a document through email for printing. There are also some solutions that provide driverless printing from the web browser. However, these solutions are not seamless since they involve navigating the path of the document and then uploading the document to a web server for printing. These solutions also involve the use of a dedicated web server to host the web user interface and send the print job to the printer. And, like the email printing noted above, these solutions offer no direct way to print web content. Other solutions that provide printing to PDF involve a web service to convert web pages into PDF documents. These solutions also do not really address the issue of providing a hardcopy printout.

In general, the print workflow from web browsers is almost as varied as the number of major web browsers available. In the case of mobile computing devices, the lack of a native print driver architecture in the operating systems means that users have a limited ability to print web content.

Embodiments of the present disclosure improve on prior methods of printing from a web browser generally by enabling web page printing without reliance on the web browser or the operating system. The disclosed embodiments enable driverless printing across a wide range of computing platforms. In one implementation, a script (e.g., JavaScript) bookmarklet shortcut is hosted on a printer web server. The script bookmarklet is accessed by the web browser from the printer server (e.g., from a printer homepage) and added into the browser like a normal bookmark/favorite. In an alternative implementation, the bookmarklet can be automatically added as part of the printer software setup. When launched from the browser, the script bookmarklet dynamically adds a webprint toolbar over the web page that the user is currently viewing. The webprint toolbar contains a webprint button, as well as other buttons that provide additional functionality such as editing the page layout and closing the toolbar. When the user activates the webprint button, the browser accesses and executes additional script from the printer server that sends the current web page being viewed to the printer server for printing. In general, once the bookmarklet is added to the web browser, the user can browse to other websites and launch the bookmarklet to generate the webprint toolbar and append the webprint button to the current web page, enabling the user to print any web page in a seamless and driverless printing event.

In one example embodiment, a printing method includes accessing a printer server homepage with a browser and adding a bookmarklet to the browser from the homepage. The method includes accessing a content server web page with the browser, and, in response to activation of the bookmarklet, accessing and executing a toolbar script from the printer server to append a webprint toolbar to the web page. In response to activation of a print icon on the webprint toolbar, a proxy script is accessed from the printer server and executed to send the web page from the browser to the printer server.

In another embodiment, a printing method includes serving a homepage from a printer server to a client browser in response to a first browser request. The homepage includes a webprint bookmarklet script command. The method also includes serving a toolbar script from the printer server in response to a second browser request, and serving a proxy script from the printer server in response to a third browser request. The proxy script includes a cross-domain communication mechanism. The method further includes receiving at the printer server from the browser, HTML data of a web page served from a remote content server. In one implementation, the HTML data is rendered into a printer-consumable image of the web page and the image is printed.

In another embodiment, a printing system includes a computing device having a processor-readable medium to store processor-readable instructions. The instructions include a web browser executable to retrieve and present a web page from a content server, and script code retrieved from a printer server and executable to send the web page directly to the printer server.

Illustrative Embodiments

FIG. 1 shows an exemplary computing environment 100 suitable for implementing a printing system and methods as disclosed herein, according to an embodiment of the disclosure. Computing environment 100 includes client computing device 102 coupled to a content server 104 through a network 106. Network 106 is intended to represent any of a variety of conventional network topologies and types (including optical, wired and/or wireless networks), employing any of a variety of conventional network protocols (including public and/or proprietary protocols). Network 106 may include, for example, a home network, a corporate network, or the Internet, as well as one or more local area networks (LANs) and/or wide area networks (WANs) and combinations thereof. Client device 102 is also coupled to printer 108 that includes embedded printer web server 110. In one implementation client device 102 may be coupled to a local printer 108A with embedded printer server 110A through a cable 112 or other suitable local communication link. In another implementation client device 102 may be coupled to a remote printer 108B with embedded printer server 110B through a network 106.

Figure 2:
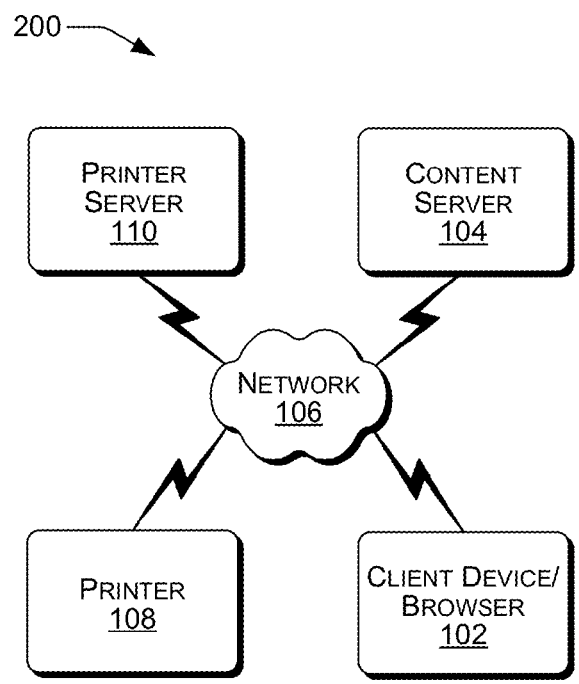
FIG. 2 shows an additional exemplary computing environment suitable for implementing a printing system and methods as disclosed herein, according to an embodiment.

FIG. 2 shows an additional exemplary computing environment 200 suitable for implementing a printing system and methods as disclosed herein, according to an embodiment of the disclosure. The computing environment 200 of FIG. 2 is similar to the environment 100 of FIG. 1, except that the printer web server 110 is not embedded in printer 108. In this embodiment, the printer server 110 may be remotely coupled to both the printer 108 and the client device 102 through a network 106.

Figure 3:
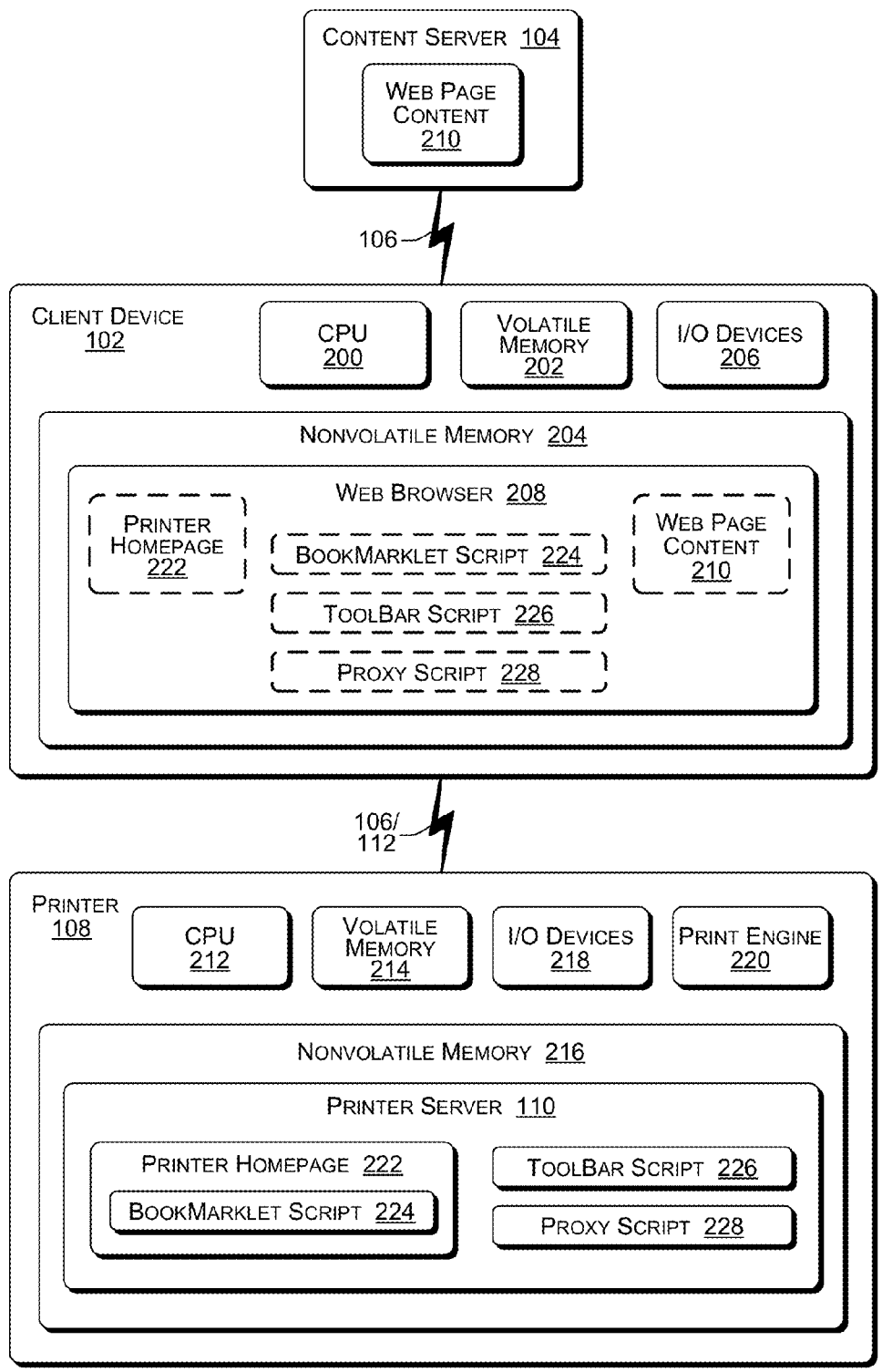
FIG. 3 shows a more detailed box diagram representation of the exemplary computing environment of FIG. 1, according to an embodiment.

FIG. 3 shows a more detailed box diagram representation of the exemplary computing environment 100 of FIG. 1, including client device 102, content server 104, and printer 108 with embedded printer server 110, according to an embodiment of the disclosure. As shown in FIG. 3, the printer 108 with embedded printer server 110 may be a device that is local to client device 102 and coupled through a local communication link or cable 112, or the printer 108 with embedded printer server 110 may be a remote device that is coupled to client device 102 via a network 106. Client device 102 may be implemented as any of a variety of conventional computing devices configurable to communicate with a server (e.g., content server 104, printer server 110) including, for example, a wireless communications device such as a cellular telephone or smart phone, a personal digital assistant (PDA), a tablet PC or other portable computer, a handheld PC, a desktop PC, a workstation, a set-top box, combinations thereof, and so on. Client device 102 generally includes a processor (CPU) 200, a volatile memory 202 (i.e., RAM), and a nonvolatile memory 204 (e.g., ROM, hard disk, floppy disk, CD-ROM, etc.). Client device 102 also typically includes various input/output devices 206 such as a keyboard, a mouse, and a monitor. Nonvolatile memory 204 and volatile memory 202 are processor-readable media that generally provide storage of computer/processor-readable instructions, data structures, program modules and other data for client device 102.

Client device 102 may implement various application programs, such as a web browser 208, and/or other instructions stored in memory 204 and/or volatile memory 202 that are executable on processor 200 to enable transactions with content server 104 and printer server 110 via a local and/or remote link (e.g., cable 112, network 106) through the input, manipulation, and/or other preparation of data in electronic form (e.g., through text entry, mouse clicks, etc.). In one implementation, for example, client device 102 executes instructions from web browser 208 and various scripts loaded from printer server 110 (e.g., bookmarklet script 224, toolbar script 226, proxy script 228) to enable a user to access, view, and print, a web page 210 served by content server 104. Web browser 208 is intended to represent any of a number of common browser software applications that retrieve, present, and traverse information resources on web servers (e.g., content server 104, printer server 110) located on the World Wide Web, private networks, or file systems. Information resources can include, web pages, images, videos, and other content identified by URI's (uniform resource identifiers) that can be entered into a web browser 208 to access the content. A web page 210 is a document usually formatted in a mark-up language such as HTML (HyperText Markup Language) or XHTML (Extensible HyperText Markup Language) that can be accessed by a web browser 208 and displayed on a screen or monitor of a client device 102, such as on a mobile smart phone.

Printer 108 is intended to represent any of a variety of printing devices having an embedded printer server 110. For example, printer 108 may be an inkjet printer, a laser printer, a single or multi-function printer, a large or small format printer, and so on. Printer 108 generally includes a processor (CPU) 212, a volatile memory 214, a nonvolatile memory 216, input/output devices 218 such as a keypad and a touch screen, and a print engine 220 to produce hardcopy images on media such as paper, transparencies, and so on. Nonvolatile memory 216 includes a printer web server 110 executable on processor 212 to deliver content at the request of client computers such as client device 102 implementing web browser 208, and to accept print jobs from client computers and send the jobs in a rendered format to an appropriate printer. In the present embodiment, printer server 110 is an embedded server in printer 108 that sends print jobs to print engine 220. However, in other embodiments the embedded printer server 110 can also send print jobs to other remote printers. In still other embodiments, such as that shown in FIG. 2, a printer server 110 may not be an embedded printer server, but instead may be a stand-alone printer server 110 that accepts print jobs from various client computers and sends the print jobs rendered in an appropriate format to any number of remote printers over a network 106.

Figure 4:
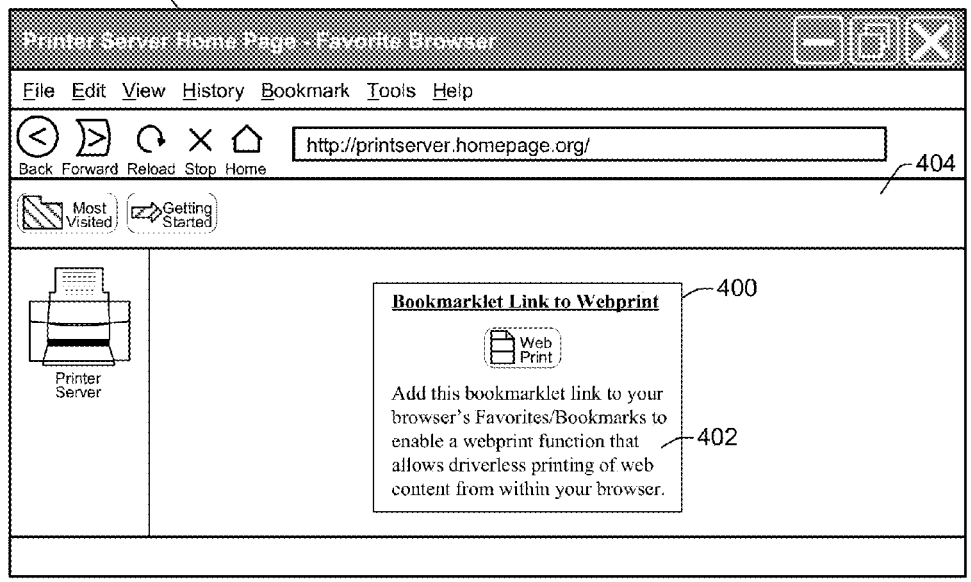
FIG. 4 shows an example of a printer homepage, according to an embodiment.

Printer server 110 serves web pages such as printer homepage 222 to client device 102 upon request. FIG. 4 shows an example of printer homepage 222, according to an embodiment of the disclosure. The printer homepage 222 includes a link 400, referred to in FIG. 4 as a "Bookmarklet Link to Webprint", that links to a bookmarklet script 224 hosted by the printer server 110. In one embodiment, the Bookmarklet Link to Webprint link 400 on the printer homepage 222 is accompanied by instructive text 402 that provides direction to a user about adding the Bookmarklet Link to Webprint 400 to the user's web browser 208. A user viewing the printer homepage 222 via a web browser 208 can add the Bookmarklet Link to Webprint 400 to the web browser 208, for example, by dragging and dropping the Bookmarklet Link to Webprint 400 from the printer homepage 222 to the web browser's toolbar 404, by "right clicking" the Bookmarklet Link to Webprint 400 and adding it to the web browser's "favorites", and so on.

Figure 5:
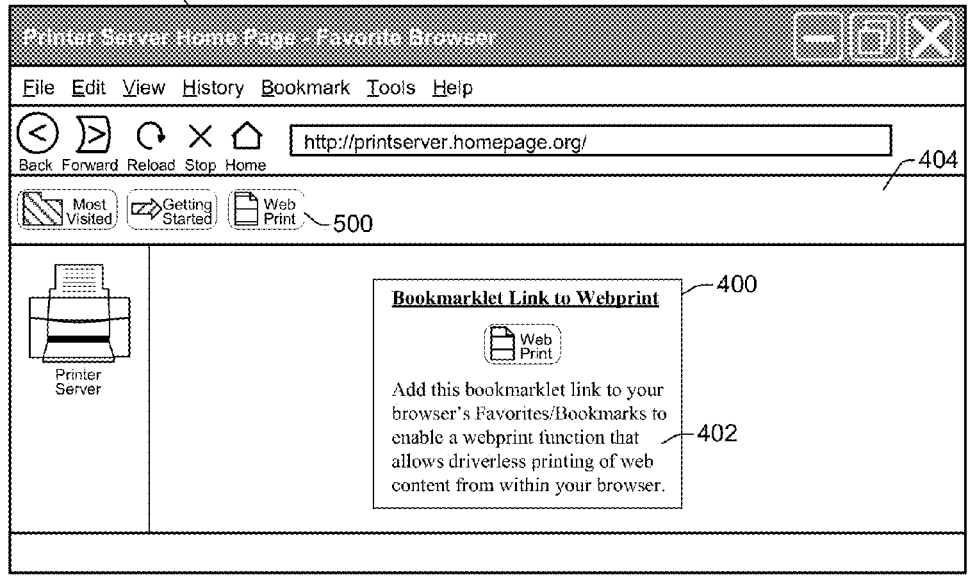
FIG. 5 shows the printer homepage after a Bookmarklet Link to Webprint has been added to the web browser, according to an embodiment.

FIG. 5 shows the printer homepage 222 after the Bookmarklet Link to Webprint 400 has been added to the web browser 208, according to an embodiment of the disclosure. In this implementation, the Bookmarklet Link to Webprint link 400 appears in the web browser toolbar 404 as a selectable "Web Print" icon 500. Upon navigating to other web pages on other servers, such as content server 104, the Web Print icon 500 remains in the web browser toolbar 404. The "Web Print" icon 500 represents the underlying bookmarklet script 224 that has been added to the web browser 208 (see FIG. 3) from the printer server 110 homepage 222. As discussed in greater detail below, the bookmarklet script 224 contains a simple script command (e.g., a JavaScript command) that executes when the Web Print icon 500 is activated by a user. Executing the bookmarklet script 224 via the Web Print icon 500 initiates a seamless and driverless printing process that enables a user to print any web page currently being presented by the web browser 208 (e.g., via a monitor or screen). Although specific examples of a printer homepage 222, a Bookmarklet Link to Webprint 400, and a selectable Web Print icon 500 have been illustrated and discussed, these examples are not intended to be a limitation in any respect regarding how such elements and features may be implemented. Those skilled in the art will recognize that there may be other ways to implement such elements and features.

Content server 104 is intended to represent any of a variety of web servers that delivers content over a network 106, such as the Internet, to clients such as client device 102 implementing a web browser 208. The content primarily includes web pages formatted in a mark-up language such as HTML or XHTML, but can also include images, videos, and other content identified by URI's. In general, content server 104 delivers content at the request of a client device 102 (i.e., web browser 208) that identifies the content using a URI. Referring again to FIG. 3, content server 104 hosts web page content 210 that it delivers to web browser 208 on client device 102 upon request.

Figure 6:
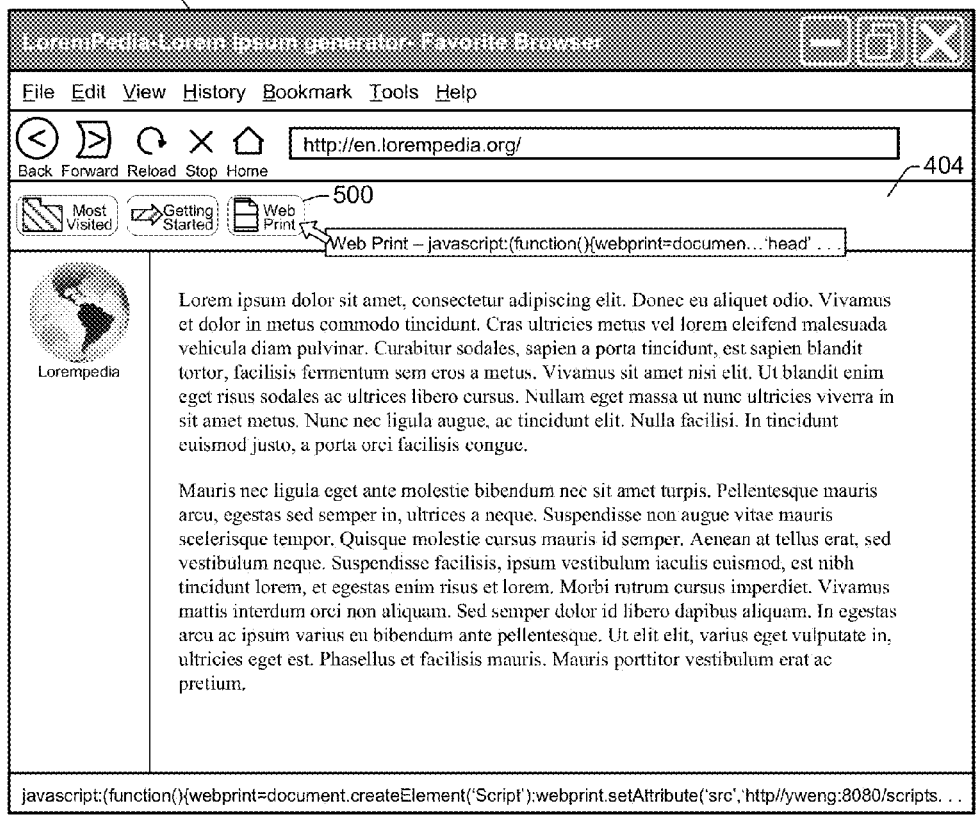
FIG. 6 shows an example web page delivered by a content server being presented by web browser on a client device, according to an embodiment.

FIG. 6 shows an example web page 210 delivered by content server 104 that is being presented by web browser 208 on a client device 102, according to an embodiment. As shown in FIG. 6, the Web Print icon 500 with the underlying bookmarklet script 224 has already been added to the web browser 208. As noted above, activating the Web Print icon 500 executes the bookmarklet script 224 which initiates a seamless and driverless printing process that prints web page 210, or any other web page currently being presented by the web browser 208. More specifically, the bookmarklet script 224 includes a script command that links back to the printer server 110, and fetches and loads a toolbar script 226 from the printer server 110 to the web browser 208 on client device 102, as shown in FIG. 3.

Figure 7:
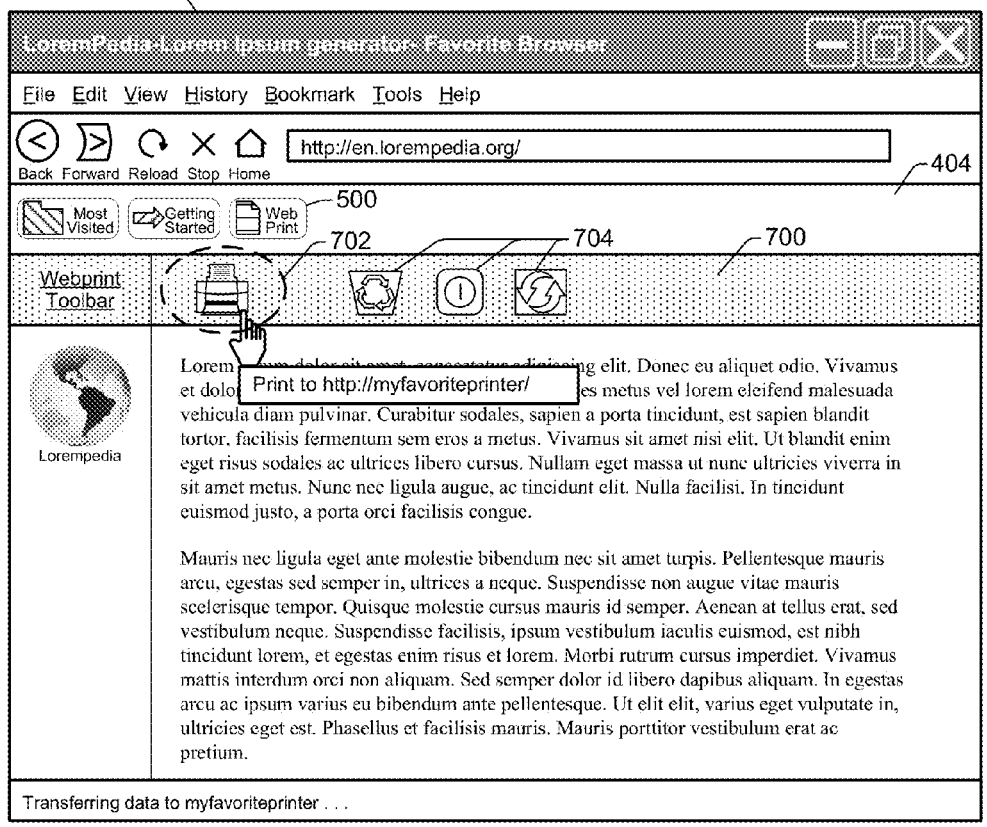
FIG. 7 shows an example web page after a Web Print icon has been activated by a user to execute a bookmarklet script, according to an embodiment.

FIG. 7 shows an example web page 210 after the Web Print icon 500 has been activated by a user to execute bookmarklet script 224, loading toolbar script 226, according to an embodiment. When the toolbar script 226 is loaded from the printer server 110 into web browser 208, a first part of the toolbar script 226 executes to generate a "WebPrint Toolbar" 700. The toolbar script 226 dynamically creates the "WebPrint Toolbar" 700 and the elements of the toolbar 700 such as a print button 702 that initiates a web page print function, and other function buttons 704 that may implement functions such as page editing, closing the toolbar 700, and so on.

Figure 8:
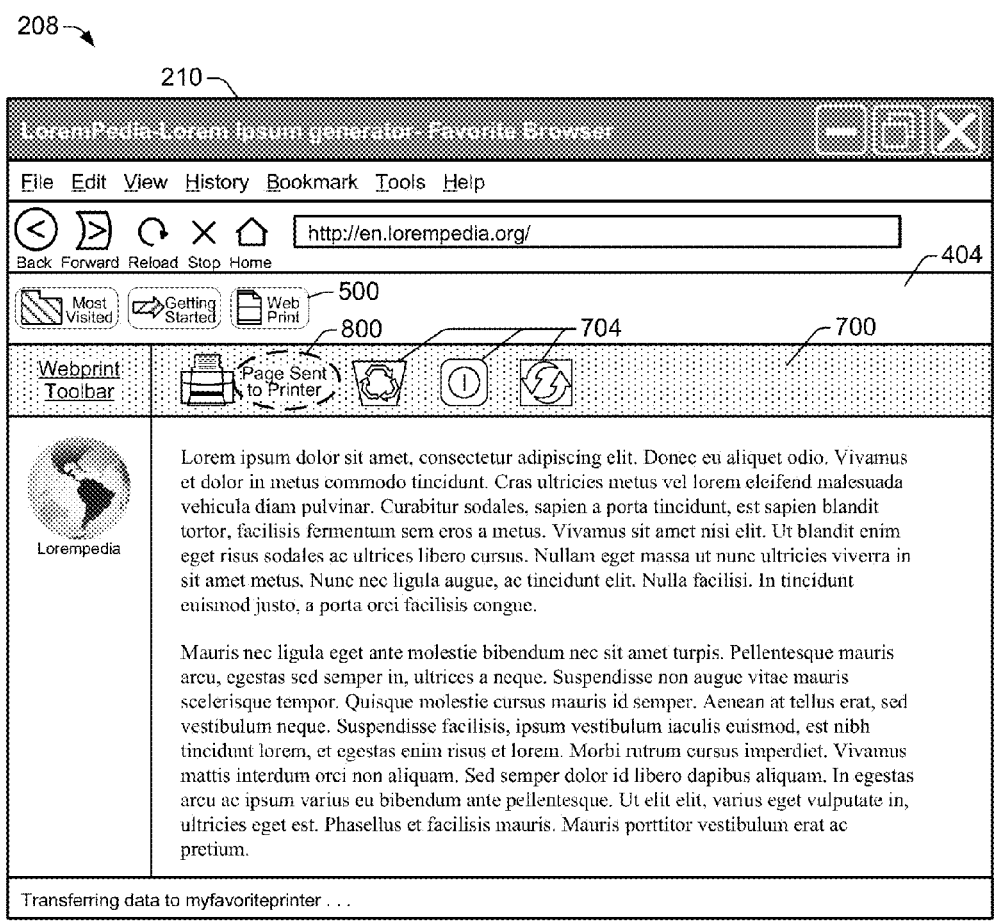
FIG. 8 shows an example web page after the print button on the WebPrint Toolbar has been activated, according to an embodiment.

FIG. 8 shows an example web page 210 after the print button 702 on the WebPrint Toolbar 700 has been activated, according to an embodiment of the disclosure. When a user activates (i.e., selects, or clicks on) the print button 702 in the WebPrint Toolbar 700, a second part of the toolbar script 226 executes to link back to the printer server 110. The second part of the toolbar script 226 fetches and loads a proxy script 228 from the printer server 110 to the web browser 208 on client device 102, as shown in FIG. 3. The second part of the toolbar script 226 also retrieves the head and body of the web page 210 (i.e., the DOM head and DOM body) and sends them to a proxy frame using the proxy script 228.

Proxy script 228 includes a cross-domain communication mechanism that is used to circumvent the "same origin policy" enforced by web browsers. In brief, the "same origin policy" is a security policy enforced by web browsers that prevents scripts running on web pages originating from different web sites (i.e., different server domains) from accessing each other's methods and properties. Thus, the cross-domain communication mechanism in proxy script 228 enables sending the web page 210 (e.g., as a string of HTML data) from the web browser 208 on client device 102 to the printer server 110 (e.g., on printer 108). One example of a cross-domain communication mechanism that is suitable for use as proxy script 228 is an open source library called EasyXDM. Using the cross-domain communication mechanism, the head, body and other elements of web page 210 can be sent as a string of HTML data to the printer server 110 via HTTP POST operations. After the web page 210 is sent to the printer server, the WebPrint Toolbar 700 may display a message 800 indicating the page has been sent, as shown in FIG. 8.

The printer server 110 then reassembles the web page 210, renders it to an appropriate format for printer 108 (or other printer), and sends the rendered image of the web page 210 to the printer for printing. In one embodiment, prior to sending the rendered image of the web page 210 to the printer for printing, the printer server 110 sends the rendered image of the web page 210 back to web browser 208 on client device 102 as a print preview.

Figure 9:
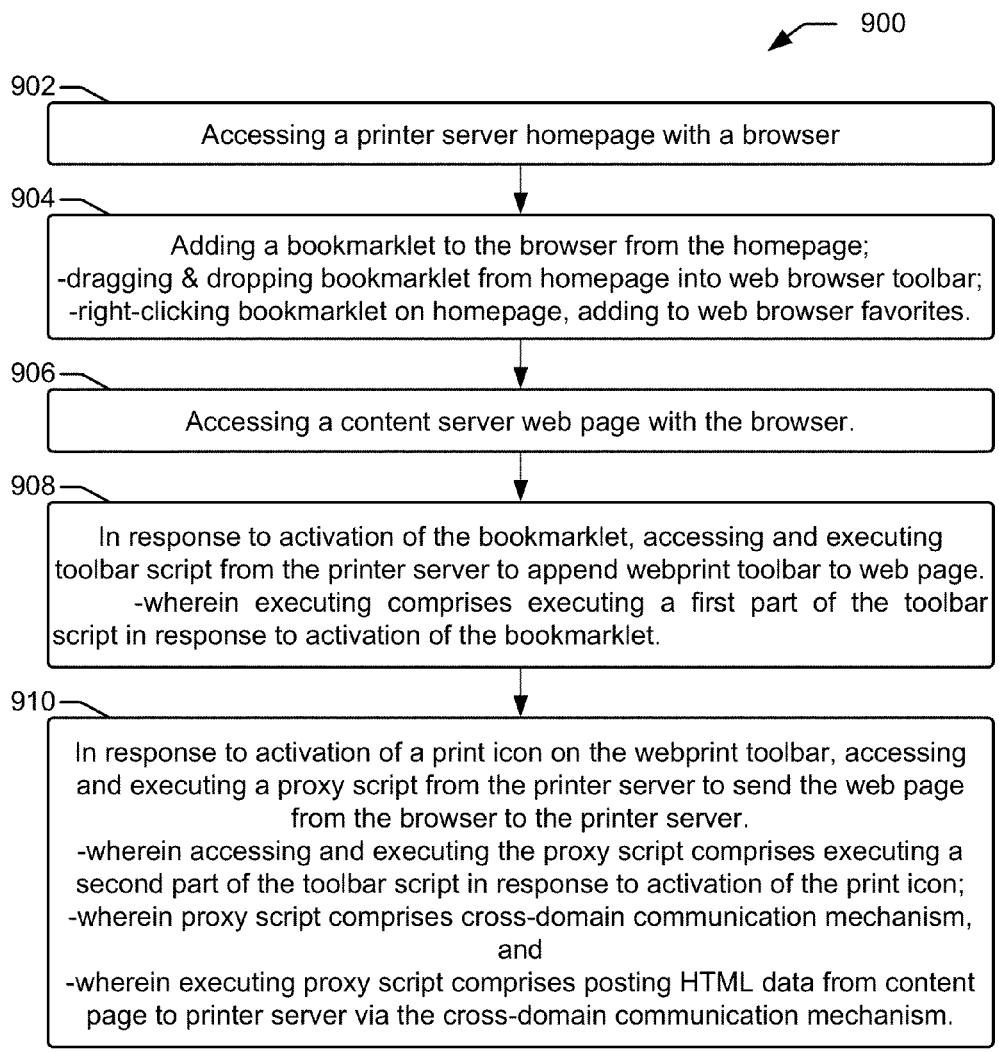
FIG. 9 shows a flowchart of an example printing method, according to an embodiment.

FIG. 9 shows a flowchart of an example printing method 900, according to an embodiment of the disclosure. Method 900 is associated with the embodiments discussed above with regard to FIGS. 1-8, and details of the steps shown in method 900 can be found in the related discussion of such embodiments. Method 900 begins at block 902 with accessing a printer server homepage with a web browser. Accessing the homepage involves entry of a URI into the web browser that identifies the homepage and presenting the homepage through the browser (e.g., on a monitor or screen of a client device 102). The method 900 continues at block 904 with adding a bookmarklet to the browser from the homepage. Adding the bookmarklet to the browser can be done, for example, by a user dragging and dropping the bookmarklet from the printer homepage into the web browser toolbar, or by right-clicking the bookmarklet and adding it as a favorite in the web browser. Adding the bookmarklet includes adding a bookmarklet script to the web browser.

At step 906 of method 900, a web page is accessed from a content server by the browser. Accessing the web page on the content server involve entry of the web page URI into the browser and navigating to the web page, for example, over a network. At step 908 of method 900, in response to activation of the bookmarklet, a toolbar script is accessed from the printer server and executed to append a webprint toolbar to the web page. Activation of the bookmarklet includes executing the bookmarklet script. Executing the toolbar script to append the webprint toolbar to the web page includes executing a first part of the toolbar script in response to activation of the bookmarklet. The method continues at step 910 with, in response to activation of a print icon on the webprint toolbar, accessing and executing a proxy script from the printer server to send the web page from the browser to the printer server. Accessing and executing the proxy script comprises executing a second part of the toolbar script in response to activation of the print icon. The proxy script comprises cross-domain communication mechanism (e.g., EasyXDM), and executing the proxy script comprises posting HTML data from the content page to the printer server via the cross-domain communication mechanism.

Figure 10:
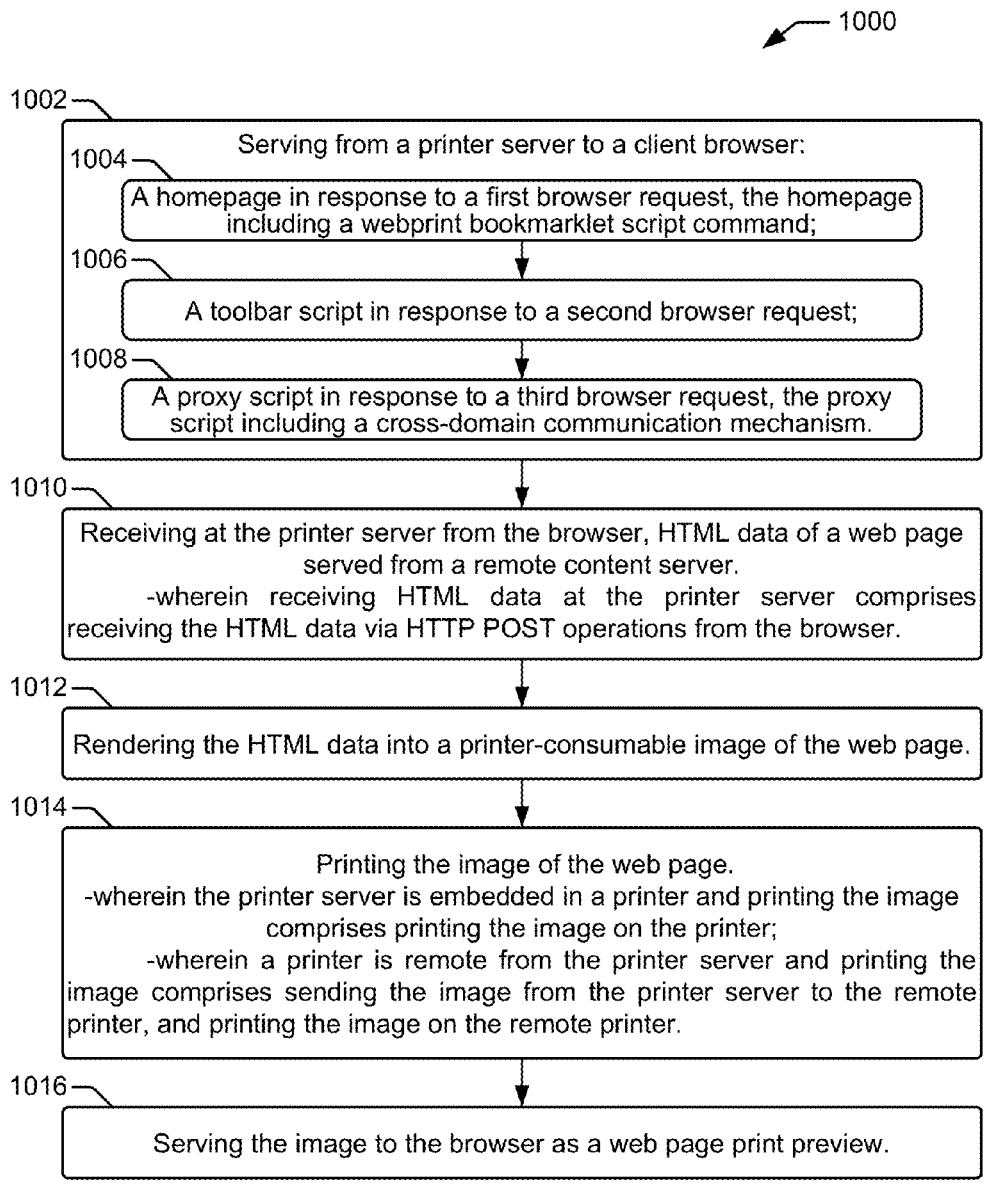
FIG. 10 shows a flowchart of another example printing method, according to an embodiment.

FIG. 10 shows a flowchart of another example printing method 1000, according to an embodiment of the disclosure. Method 1000 is associated with the embodiments discussed above with regard to FIGS. 1-8, and details of the steps shown in method 1000 can be found in the related discussion of such embodiments. Method 1000 begins at block 1002 with serving from a printer server to a client browser, a homepage in response to a first browser request, where the homepage includes a webprint bookmarklet script command (block 1004), a toolbar script in response to a second browser request (block 1006), and a proxy script in response to a third browser request, where the proxy script includes a cross-domain communication mechanism (block 1008). The method 1000 continues at block 1010 with receiving at the printer server from the browser, HTML data of a web page served from a remote content server. Receiving HTML data at the printer server comprises receiving the HTML data via HTTP POST operations from the browser.

At block 1012 of method 1000, the HTML data is rendered into a printer-consumable image of the web page, and at block 1014 the image of the web page is printed. In one embodiment, the printer server is embedded in a printer and printing the image comprises printing the image on the printer. In another embodiment, a printer is remote from the printer server and printing the image comprises sending the image from the printer server to the remote printer, and printing the image on the remote printer.

The method 1000 can also include the step of serving the rendered image back to the browser as a web page print preview, as shown at block 1016.

What is claimed is:

1. A printing method comprising:
   accessing a printer server homepage from a print server with a browser, where the printer server is a server to accept print jobs from client computers and send the jobs in a rendered format to an appropriate printer, and the printer server also provides the printer server homepage to the browser;
   adding a bookmarklet to the browser from the homepage;
   accessing a content server web page with the browser;
   in response to activation of the bookmarklet, accessing and executing a toolbar script from the printer server to append a webprint toolbar to the web page;
   in response to activation of a print icon on the webprint toolbar, accessing and executing a proxy script from the printer server to send the web page from the browser to the printer server.

2. A method as in claim 1, further comprising receiving a rendered image of the web page from the printer server to display as a print preview in the browser.

3. A method as in claim 1, wherein the proxy script comprises a cross-domain communication mechanism, and wherein executing the proxy script comprises posting HTML data from the content page to the printer server via the cross-domain communication mechanism.

4. A method as in claim 1, wherein adding the bookmarklet to the browser from the homepage comprises adding a bookmarklet script to the browser from the homepage.

5. A method as in claim 4, wherein activation of the bookmarklet comprises executing the bookmarklet script.

6. A method as in claim 1, wherein adding the bookmarklet to the browser comprises dragging and dropping a bookmarklet link on the printer server homepage to a toolbar of the browser.

7. A method as in claim 1, wherein adding the bookmarklet to the browser comprises adding a bookmarklet link on the printer server homepage to a list of favorite links of the browser.

8. A printing method comprising:
   accessing a printer server homepage with a browser;
   adding a bookmarklet to the browser from the homepage;
   accessing a content server web page with the browser;
   in response to activation of the bookmarklet, accessing and executing a toolbar script from the printer server to append a webprint toolbar to the web page;
   in response to activation of a print icon on the webprint toolbar, accessing and executing a proxy script from the printer server to send the web page from the browser to the printer server;
   wherein:
   executing the toolbar script comprises executing a first part of the toolbar script in response to activation of the bookmarklet; and
   accessing and executing the proxy script comprises executing a second part of the toolbar script in response to activation of the print icon.

9. A printing method comprising:
   with a printer server, which is a server to accept print jobs from client computers and send the jobs in a rendered format to an appropriate printer, serving from the printer server to a client browser;
   a homepage in response to a first browser request, the homepage including a webprint bookmarklet script command;
   a toolbar script in response to a second browser request; and
   a proxy script in response to a third browser request, the proxy script including a cross-domain communication mechanism; and
   receiving at the printer server from the browser, HTML data of a web page served from a remote content server.

10. A method as in claim 9, further comprising:
    rendering the HTML data into a printer-consumable image of the web page; and
    printing the image of the web page.

11. A method as in claim 10, further comprising serving the image to the browser as a web page print preview.

12. A method as in claim 10, wherein the printer server is embedded in a printer and printing the image comprises printing the image on the printer.

13. A method as in claim 10, wherein a printer is remote from the printer server and printing the image comprises:
    sending the image from the printer server to the remote printer; and
    printing the image on the remote printer.

14. A method as in claim 9, wherein receiving HTML data at the printer server comprises receiving the HTML data via HTTP POST operations from the browser.

15. A printing system comprising:
   a computing device including a processor-readable medium to store processor-readable instructions, the instructions comprising:
   a web browser executable to retrieve and present a web page from a content server; and
   script code retrieved from a printer server and executable to send the web page directly to the printer server, wherein the printer server is a server to accept print jobs from client computers and send the jobs in a rendered format to an appropriate printer.

16. A printing system as in claim 15, wherein the script code comprises:
   a bookmarklet script executable to fetch a toolbar script from the printer server;
   the toolbar script executable to create a webprint toolbar with a print function for printing the web page being presented by the web browser; and
   proxy script including a cross-domain communication mechanism to enable posting the web page to the printer server.

17. A printing system as in claim 15, further comprising a rendered image of the web page received from the printer server as a print preview.

18. A printing system as in claim 15, wherein the script code sends the web page to the printer server as HTML data via HTTP POST operations from the browser.

19. A printing system as in claim 15, wherein the printer server is embedded in a printer and sends print jobs to both the printer in which it is embedded and other remote printers.

20. A printing system as in claim 15, wherein said web page comprises a bookmarklet link that, when selected, provides the script code from the printer server to the computing device.

* * * * *